(12) United States Patent
Garcia et al.

(10) Patent No.: US 9,580,187 B2
(45) Date of Patent: Feb. 28, 2017

(54) ROTOR INDEX SENSOR SYSTEM

(71) Applicant: Sikorsky Aircraft Corporation, Stratford, CT (US)

(72) Inventors: Todd A. Garcia, Mansfield, TX (US); Carson M. Ingels, Seymour, CT (US); Jiwoo Lee, McKinney, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 391 days.

(21) Appl. No.: 14/258,582

(22) Filed: Apr. 22, 2014

(65) Prior Publication Data
US 2015/0298818 A1 Oct. 22, 2015

(51) Int. Cl.
B64D 45/00 (2006.01)
B64C 27/12 (2006.01)
B64C 27/00 (2006.01)
B64C 27/82 (2006.01)

(52) U.S. Cl.
CPC ........ B64D 45/0005 (2013.01); B64C 27/008 (2013.01); B64C 27/12 (2013.01); B64C 27/82 (2013.01); B64C 2027/8236 (2013.01)

(58) Field of Classification Search
CPC .................................................. G05D 1/0858
USPC ...................................................... 244/17.13
See application file for complete search history.

(56) References Cited

U.S. PATENT DOCUMENTS

| | | | |
|---|---|---|---|
| 3,554,662 A | 1/1971 | Lemont | |
| 3,938,762 A * | 2/1976 | Murphy | B64C 27/001 244/17.13 |
| 3,954,229 A * | 5/1976 | Wilson | B64C 27/001 244/17.13 |
| 4,531,408 A | 7/1985 | Chadwick et al. | |
| 5,210,704 A * | 5/1993 | Husseiny | G01H 1/003 702/34 |
| 5,381,692 A | 1/1995 | Winslow et al. | |
| 5,749,540 A | 5/1998 | Arlton | |
| 5,853,144 A | 12/1998 | Vincent | |

(Continued)

FOREIGN PATENT DOCUMENTS

WO 2011137417 A2 11/2011
WO 2013104900 A1 7/2013

OTHER PUBLICATIONS

International Search Report and Written Opinion issued in corresponding PCT Application No. PCT/US2015/026628 on Jan. 7, 2016.

*Primary Examiner* — Timothy D Collins
*Assistant Examiner* — Keith L Dixon
(74) *Attorney, Agent, or Firm* — Cantor Colburn LLP

(57) ABSTRACT

An aircraft is provided and includes an airframe having main, pylon and tail sections, a rotor disposed at one of the pylon and tail sections and rotatable about a rotational axis to drive the airframe and a primary gearbox disposed within the main section of the airframe and a secondary gearbox disposed within one of the pylon and tail sections. The primary gearbox includes an outer housing rotationally fixed relative to the airframe and a driveshaft extending through the outer housing and coupled to the secondary gearbox to thereby drive rotation of the rotor relative to the airframe via the secondary gearbox. The aircraft further including a sensing system affixed to the outer housing and the driveshaft and configured to sense rotational characteristics of the driveshaft.

6 Claims, 5 Drawing Sheets

(56) References Cited

U.S. PATENT DOCUMENTS

| | | | |
|---|---|---|---|
| 5,942,690 A | 8/1999 | Shvetsky | |
| 5,948,023 A * | 9/1999 | Evans | G05D 1/0858 |
| | | | 244/17.13 |
| 6,029,930 A * | 2/2000 | Maino | B64C 27/14 |
| | | | 180/337 |
| 6,334,592 B1 | 1/2002 | Tomio et al. | |
| 6,364,772 B1 | 4/2002 | Sugden | |
| 7,195,209 B2 | 3/2007 | Schievelbusch | |
| 7,385,332 B2 | 6/2008 | Himmelmann et al. | |
| 7,389,162 B2 | 6/2008 | Altieri et al. | |
| 7,925,392 B2 | 4/2011 | Altieri et al. | |
| 8,109,156 B2 | 2/2012 | Schmeisser et al. | |
| 8,581,458 B2 | 11/2013 | Wallner et al. | |
| 8,777,152 B2 * | 7/2014 | Thomassey | B64C 27/82 |
| | | | 244/17.13 |
| 2009/0293639 A1 | 12/2009 | Schmeisser et al. | |
| 2010/0116925 A1 | 5/2010 | Segal | |
| 2011/0103173 A1 | 5/2011 | May | |
| 2013/0046486 A1 | 2/2013 | Pennell | |

* cited by examiner

ROTOR INDEX SENSOR SYSTEM

BACKGROUND OF THE INVENTION

The subject matter disclosed herein relates to a rotor index (azimuth position) sensor system and, more particularly, to an integrated sensor system for real-time rotor indexing during flight.

Typically, rotor indexing for balance purposes requires that a piece of reflective tape be placed on an external rotating piece of hardware in the drive system so that an optical sensor can read its position. This presents multiple problems in that such optical systems are inherently sensitive to dirt and dust and, as such, signal integrity can be compromised during normal operations. Additional problems are that the reflector tape is generally held in place only by adhesive and failure of such adhesive is likely such that the tape often comes apart from the hardware during operation and no longer provides for signal generation. This potentially requires a reset of the system and increased cost and time expenditures. Still further problems are that the blade tracking systems may only be employed during ground runs and can require removal of several components required for flight (e.g., the engine air intake ducting) and the temporary attachment of the optical sensor.

BRIEF DESCRIPTION OF THE INVENTION

According to one aspect of the invention, an aircraft is provided and includes an airframe having a main section, a pylon section and a tail section, a rotor, which is disposed at one of the pylon section and the tail section and is rotatable about a rotational axis to provide drive to the airframe and a primary gearbox, which is disposed within the main section of the airframe, and a secondary gearbox, which is disposed within one of the pylon section and the tail section of the airframe. The primary gearbox includes an outer housing, which is rotationally fixed relative to the airframe, and a driveshaft, which extends through the outer housing and is coupled to the secondary gearbox to thereby drive rotation of the rotor relative to the airframe via the secondary gearbox. The aircraft further including a sensing system affixed to the outer housing and the driveshaft and configured to sense rotational characteristics of the driveshaft.

In accordance with embodiments or, as an alternative, the sensing system is configured to sense any rotational position as a function of time of the driveshaft.

In accordance with embodiments or, as an alternative, the primary gearbox includes fastening elements configured to couple the outer housing to the airframe and bearing elements rotatably supportive of the driveshaft.

In accordance with embodiments or, as an alternative, the sensing system includes a sensor element affixed to the outer housing and a sensor component affixed to the driveshaft.

In accordance with embodiments or, as an alternative, the sensing system generates a 1/rev pass signal.

In accordance with embodiments or, as an alternative, at least one or both of the sensor element and the sensor component includes a plurality of sensor elements or sensor components, respectively, wherein the sensing system generates n/rev pass signals.

In accordance with embodiments or, as an alternative, the aircraft further includes a flight computer, which is receptive of a pass signal associated with the sensed rotational characteristics and which is configured to determine an azimuth location.

According to yet another aspect of the invention, a primary gearbox having an integral rotor position sensing system for use in detecting a position of a rotor of an aircraft is provided. The aircraft includes an airframe, the primary gearbox and a secondary gearbox. The primary gearbox is disposed within a main section of the airframe and the secondary gearbox is disposed within one of a pylon section and a tail section of the airframe. The primary gearbox includes an outer housing, which is rotationally fixed relative to the airframe, and a driveshaft, which extends through the outer housing and is coupled to the secondary gearbox to thereby drive rotation of the rotor relative to the airframe via the secondary gearbox. The aircraft further includes a sensing system affixed to the outer housing and the driveshaft and configured to sense rotational characteristics of the driveshaft.

In accordance with embodiments or, as an alternative, the sensing system is configured to sense any rotational position as a function of time of the driveshaft.

In accordance with embodiments or, as an alternative, the primary gearbox includes fastening elements configured to couple the outer housing to the airframe and bearing elements rotatably supportive of the driveshaft.

In accordance with embodiments or, as an alternative, the sensing system includes a sensor element affixed to the outer housing and a sensor component affixed to the driveshaft.

In accordance with embodiments or, as an alternative, the sensing system generates a 1/rev pass signal.

In accordance with embodiments or, as an alternative, at least one or both of the sensor element and the sensor component includes a plurality of sensor elements or sensor components, respectively, wherein the sensing system generates n/rev pass signals.

In accordance with embodiments or, as an alternative, the aircraft further includes a flight computer, which is receptive of a pass signal associated with the sensed rotational characteristics and which is configured to determine an azimuth location.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a sensor or sensors depending on aircraft configuration and needs is integrated into a main (i.e., primary) gearbox of an aircraft and is triggered by a component integral to the drivetrain (i.e., driveshaft). The sensor(s) can be the same style and type of sensor as those used to determine main rotor RPM, which are located in different sections of the gearbox. The sensor(s) may be triggered by a feature that is integrally part of a rotating component within the gearbox, such as a tang or machined recess in a gear or the driveshaft. This feature will trigger the sensor(s) at least once per revolution and allow the flight computer or monitoring technician to determine the azimuth location of the rotor system.

Figure 1:
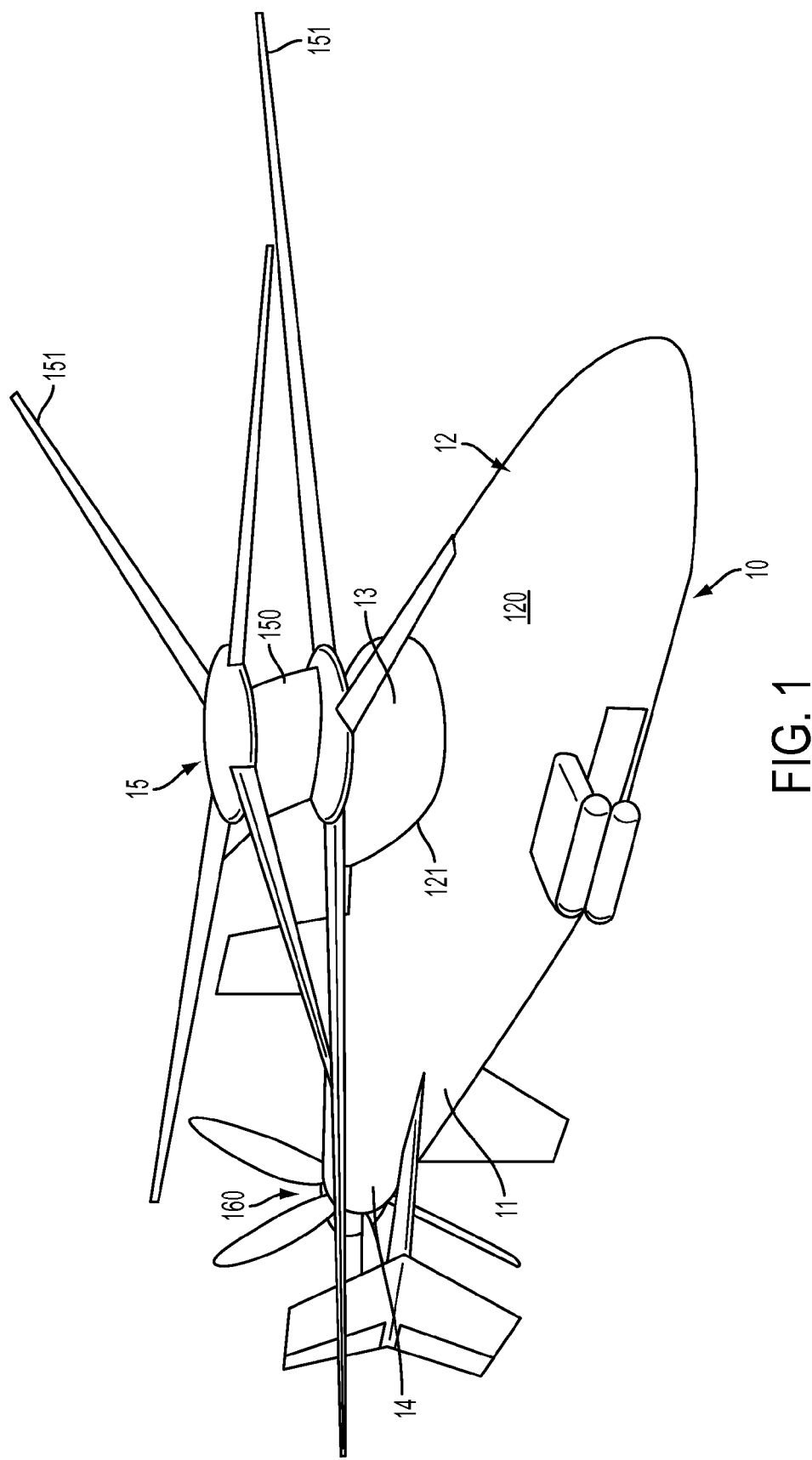
FIG. 1 is a schematic illustration of an aircraft in accordance with embodiments.

With reference to FIGS. 1, 2, 3 and 8, an aircraft 10 is provided. The aircraft 10 may be a helicopter 11 or another similar type of aircraft. As shown in FIG. 1, the aircraft 10 includes an airframe 12, which is formed to define a cabin 120 and which includes a main section 121, a pylon section 13 and a tail section 14. The pylon section 13 is supportive of a main rotor section 15 that includes a main rotor shaft 150 and main rotors 151, which are coupled to the main rotor shaft 150. The tail section 14 is supportive of a propeller assembly 160. The cabin 13 is sized to accommodate a pilot and, in some cases, additional crewmen and/or passengers as well as control and navigational features.

The aircraft 10 further includes an engine 20, a primary gearbox 30, a secondary gearbox 35, a sensing system 40 and a flight computer 50, which are all disposed within the airframe 12. The engine 20 generates power to drive rotation of the main rotors 151 and the propeller assembly 160. The primary gearbox 30 is disposed within the main section 121 of the airframe 12 and the secondary gearbox 35 is disposed within one of the pylon section 13 and the tail section 14 of the airframe 12. The primary gearbox 30 is operably disposed between the engine 20 and the main rotor shaft 150 (and the secondary gearbox 35) and between the engine 20 and the propeller assembly 160 (and the secondary gearbox 35). That is, the engine 20 drives rotation of various components of the primary gearbox 30, which, in turn, drive via the secondary gearbox 35 rotation of the main rotor shaft 150 and the main rotors 151 about a longitudinal axis of rotation of the main rotor shaft 150 as well as rotation of the propeller assembly 160.

Figure 2:
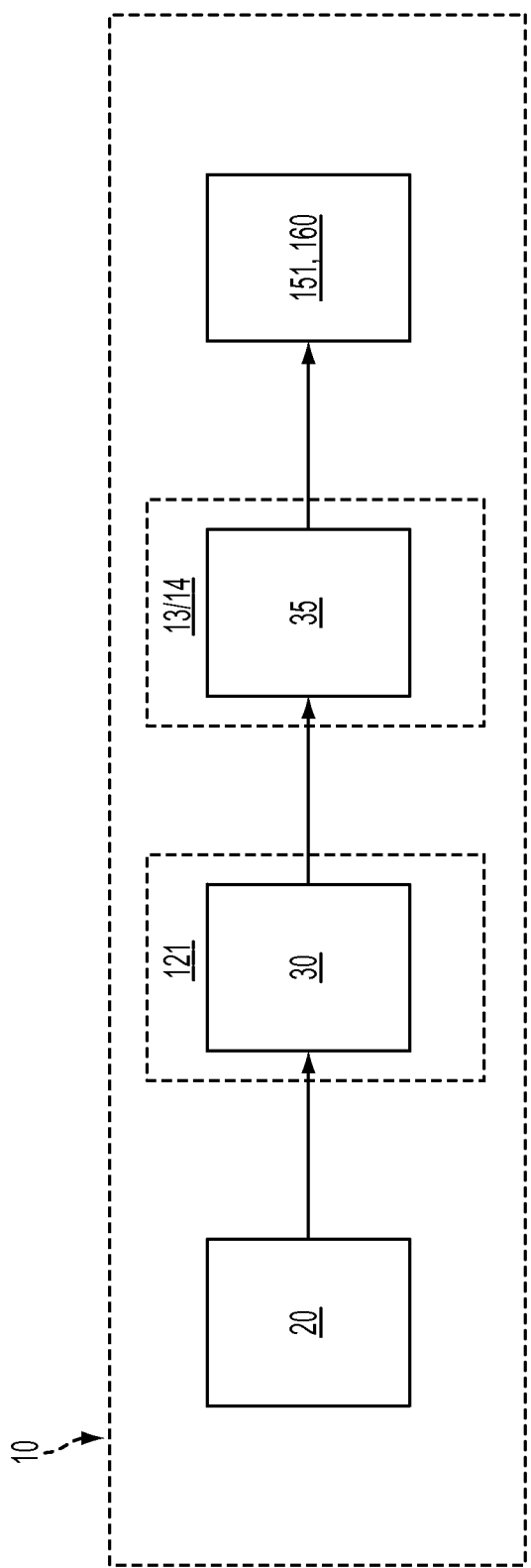
FIG. 2 is a schematic diagram of an engine, a primary gearbox and a secondary gearbox of the aircraft of FIG. 1.

As shown in FIGS. 1 and 2 and, in accordance with embodiments, the aircraft 10 may be provided as a helicopter 11 having first and second coaxial, counter-rotating main rotors with the propeller assembly 160. It will be understood that this is not required, however, and that the description provided herein is applicable for any aircraft or ground based turbine. By way of example, a conventional single rotor helicopter could be used having a tail rotor which is not a pusher prop.

Figure 3:
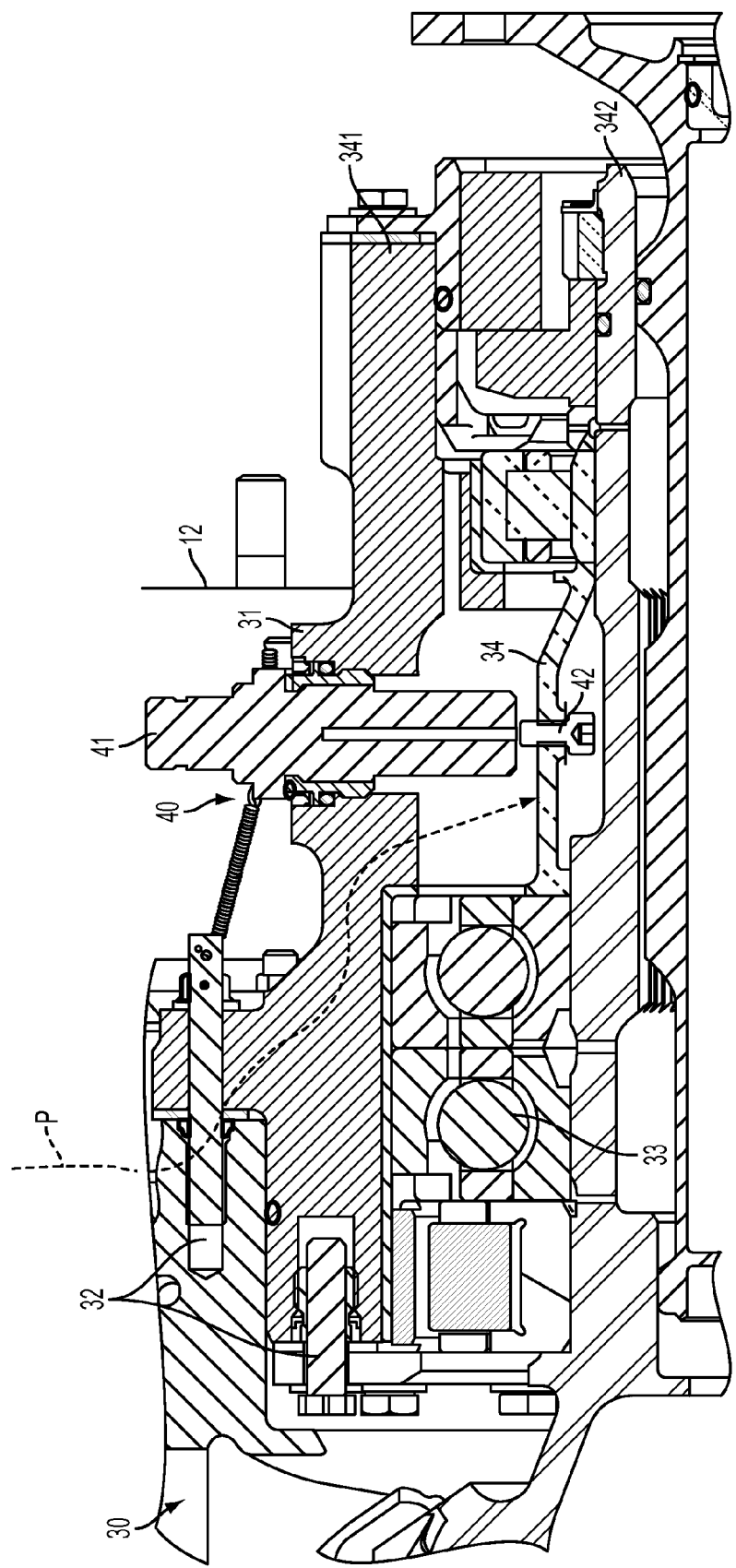
FIG. 3 is a side view of the primary gearbox and a sensing system of the aircraft of FIGS. 1 and 2 in accordance with embodiments.

As shown in FIG. 3, the primary gearbox 30 includes an outer housing 31, fastening elements 32, bearing elements 33 and rotational components (hereinafter referred to as a "driveshaft") 34. The outer housing 31 of the primary gearbox 30 is supportively disposed within and coupled to local portions of the main section 121 of the airframe 12 by the fastening elements 32. The outer housing 31 is thus rotationally fixed relative to the main section 121 of the airframe 12. In this rotationally fixed condition, the outer housing 31 is configured to be supportive of multiple ones of the bearing elements 33 and the bearing elements 33 are rotatably supportive of the driveshaft 34. Rotation of the driveshaft 34 relative to the airframe 12 is driven by the engine 20 and such rotation is transmitted along the driveshaft 34 and via the secondary gearbox 35 to the main rotor shaft 150 and the propeller assembly 160.

In accordance with embodiments, the driveshaft 34 may include an outer shaft 341 and an inner shaft 342. The outer shaft 341 is rotatably supported by the bearing elements 33 and the inner shaft 342 is fixed to the outer shaft 341. As such, while the outer shaft 341 is rotatable relative to the airframe 12, no relative rotation occurs between the outer shaft 341 and the inner shaft 342.

The sensing system 40 is disposed within the primary gearbox 30 to sense rotational characteristics of the main rotor 151 and/or the propeller assembly 160. More particularly, the sensing system 40 is configured to sense rotational characteristics of the driveshaft 34, such as any rotational position as a function of time of the driveshaft 34. The sensing system 40 includes a sensor element 41 and a sensor component (or sensed element) 42. The sensor element 41 is affixed or integrally affixed to the outer housing 31 of the primary gearbox 30 and is thus rotationally fixed relative to the airframe 12. The sensor component 42 is disposed on or integrally affixed to the driveshaft 34 and, in some cases, on the outer shaft 341. With this arrangement, the sensor component 42 passes the sensor element 41 once per revolution of the driveshaft 34 (1/rev).

Figure 4:
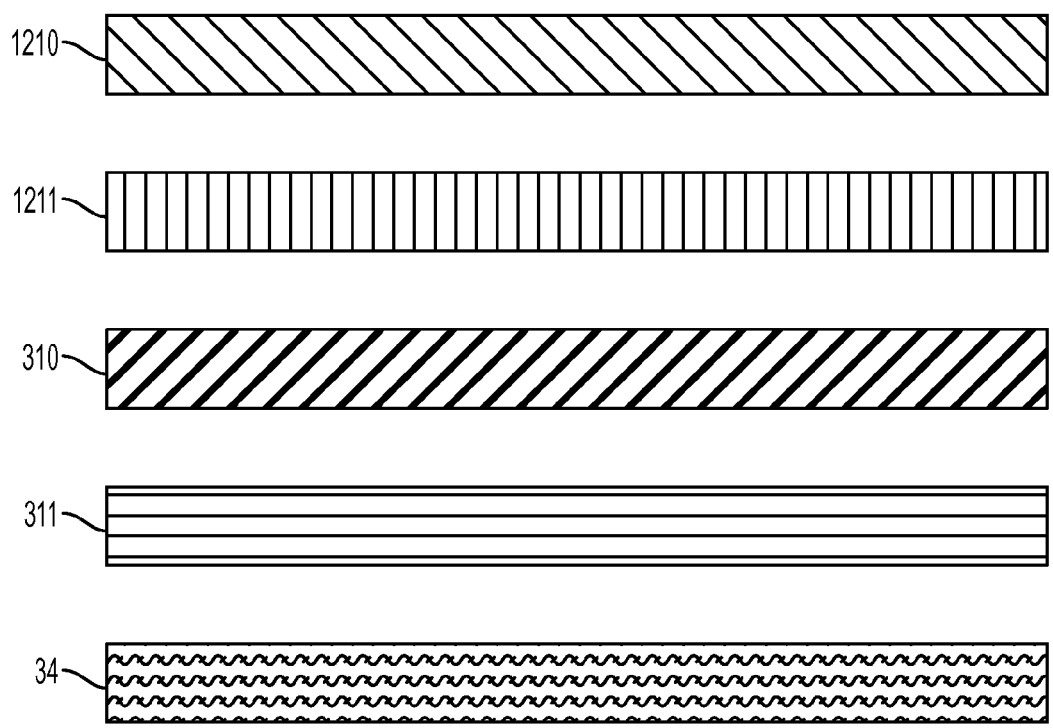
FIG. 4 is a schematic illustration of structural layers of the aircraft of FIG. 1.

With the sensing system 40 disposed in the primary gearbox 30 and the primary gearbox 30 disposed within the main section 121 of the airframe 12, it is to be understood that the sensing system 40 may be displaced from the pylon section 13 and the tail section 14 or the airframe 12. As such, the sensor element 41 and the sensor component 42 may be difficult to access through normal maintenance, service or repair operations than they otherwise would be if the sensing system 40 were disposed in the pylon section 13 or the tail section 14. With reference to FIGS. 3 and 4, this is due at least in part to the fact that access to an interior of the primary gearbox 30 requires penetration into the main section 121 of the airframe 12, which may be more complicated than penetration into the pylon section 13 or the tail section 14. As shown in FIGS. 3 and 4, such penetration may require penetration along a path P past, around or through an aircraft skin layer 1210, first and/or second layers of interior aircraft structures 1211 (e.g., electronic components, wiring, fastening elements 32, etc.), an exterior portion 310 of the gearbox outer housing 31, an interior portion 311 of the gearbox outer housing 31 and the driveshaft 34.

Figure 7:
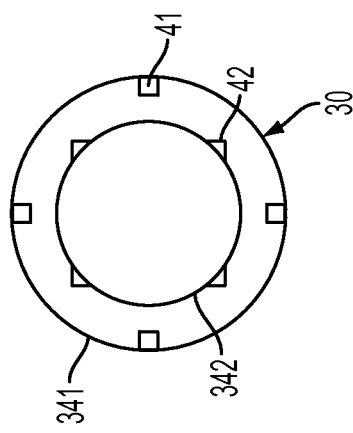
FIG. 7 is an axial view of the sensing system of FIG. 3 in accordance with further embodiments.
Figure 6:
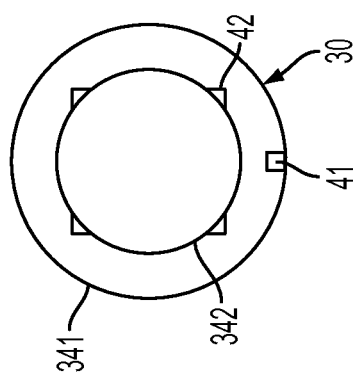
FIG. 6 is an axial view of the sensing system of FIG. 3 in accordance with further embodiments.
Figure 5:
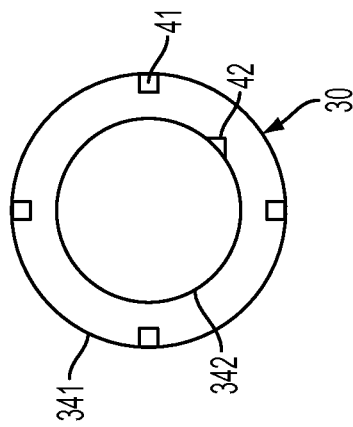
FIG. 5 is an axial view of the sensing system of FIG. 3 in accordance with embodiments.

In accordance with further embodiments and, with reference to FIGS. 5-7, at least one or both of the sensor element 41 and the sensor component 42 may be plural in number such that multiple passes occur between a sensor element 41 and a sensor component 42 on each revolution of the driveshaft 34 (n/rev). For example, where the sensor element 41 is provided as multiple sensor elements 41 arrayed around the primary gearbox 30 and the sensor component 42 is a single feature, the number of passes will equal the number of the sensor elements 41 (see FIG. 5, n=4). By contrast, where the sensor element 41 is a single feature and the sensor component 42 is provided as multiple sensor components 42 arrayed around the primary gearbox 30, the number of passes will equal the number of the sensor components 42 (see FIG. 6, n=4). Lastly, where the sensor element 41 and the sensor component 42 are both provided as multiple sensor elements 41 and multiple sensor components 42, respectively, and each set is arrayed around the primary gearbox 30, the number of passes will equal the product of the respective numbers of the sensor elements 41 and the sensor components 42 (see FIG. 7, n=16).

Figure 8:
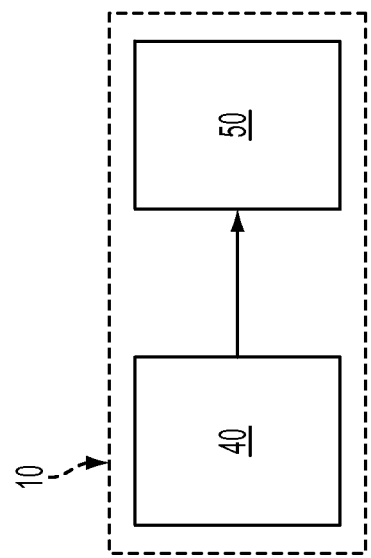
FIG. 8 is a schematic diagram of the sensing system of FIGS. 3 and 5-7 and a flight computer in accordance with embodiments.

With reference back to FIG. 3 and with additional reference to FIG. 8, the sensor element 41 may include a Hall Effect sensor, which is securably affixed to the outer housing 31 of the primary gearbox 30 by thread and rotational locking features for example. The sensor component 42 may include a corresponding interrupter component made of, e.g., ferrous material such that each pass of the sensor component 42 over the sensor element 41 produces a pass signal.

As shown in FIG. 8, this pass signal is transmittable from the sensing system 40 to the flight computer 50 and/or, in some cases, to ground personnel. The flight computer 50 is receptive of the pass signal and may make use of data derived from the pass signal to enhance aircraft performance and/or comfort and to improve avionics and flight control systems. In particular, the flight computer 50 may determine an azimuth location of the blades of the main rotors 151 or the blades of the propeller assembly 160 from the data derived from the pass signal. The flight computer 50 may further use the azimuth location to establish relative rotor azimuth positioning for balance purposes.

The flight computer 50 can thus use the azimuth information in controlling the flight of the aircraft and/or in the maintenance of the aircraft. While shown in the context of the flight control computer 50, it is understood that aspects could be used with other computers used to detect the azimuth, including those external to the aircraft connected by wired and/or wireless connections as might be the case with ground maintenance personnel.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. By way of example, while shown in the context of a rotory aircraft, aspects could be used in fixed wing aircraft transmissions, maritime transmissions, wind turbine transmission and other transmission system where positions need to be accurately assessed. Accordingly, the invention is not to be seen as limited by the foregoing description, but is only limited by the scope of the appended claims.

What is claimed is:

1. An integral rotor position sensing system for use in detecting a position of a rotor of an aircraft, the aircraft comprising:
    an airframe;
    a primary gearbox disposed within and rotationally fixed relative to a main section of the airframe;
    a secondary gearbox disposed within one of a pylon section and a tail section of the airframe; and
    a driveshaft, which extends through the outer housing and is coupled to the secondary gearbox to thereby drive rotation of the rotor relative to the airframe via the secondary gearbox, the driveshaft including an inner shaft and an outer shaft,
    the integral rotor position sensing system being displaced from the pylon and tail sections of the airframe and comprising:
    a sensor integrally affixed to an outer housing of the primary gearbox and which is rotationally fixed with the primary gearbox relative to the airframe, and
    a sensed element sensed by the sensor and which is directly attached to the outer shaft of the driveshaft,
    wherein rotational characteristics of the driveshaft are sensed according to signals received from the sensor.

2. The system according to claim 1, wherein the primary gearbox comprises:
    fastening elements configured to couple the outer housing to the airframe; and
    bearing elements rotatably supportive of the driveshaft.

3. The system according to claim 1, wherein:
    the sensor is integrally affixed to the outer housing; and
    the sensed element is integrally affixed to the driveshaft.

4. The system according to claim 3, wherein the signals comprise a 1/rev pass signal.

5. The system according to claim 3, wherein at least one or both of the sensor and the sensed element comprises a plurality of sensors or sensed elements, respectively, wherein the signals comprise n/rev pass signals.

6. The system according to claim 1, wherein the aircraft further comprises a flight computer, which is receptive of a pass signal associated with the sensed rotational characteristics and configured to determine an azimuth location.

* * * * *